United States Patent
Petit

(10) Patent No.: US 9,366,071 B1
(45) Date of Patent: Jun. 14, 2016

(54) LOW-FRICTION SPACER SYSTEM FOR VACUUM INSULATED GLASS

(71) Applicant: Peter Petit, Pewaukee, WI (US)

(72) Inventor: Peter Petit, Pewaukee, WI (US)

( * ) Notice: Subject to any disclaimer, the term of this patent is extended or adjusted under 35 U.S.C. 154(b) by 0 days.

(21) Appl. No.: 14/559,896

(22) Filed: Dec. 3, 2014

(51) Int. Cl.
*E06B 3/663* (2006.01)
*E06B 3/66* (2006.01)
*E06B 3/677* (2006.01)
*E06B 3/673* (2006.01)

(52) U.S. Cl.
CPC ........ *E06B 3/66304* (2013.01); *E06B 3/6612* (2013.01); *E06B 3/677* (2013.01); *E06B 3/67326* (2013.01)

(58) Field of Classification Search
CPC ..... E06B 3/6612; E06B 3/6604; E06B 3/663; E06B 3/66304; E06B 3/66309; E06B 3/66328; E06B 3/66333; E06B 3/66314; E06B 3/66323; E06B 3/66342; E06B 3/667; E06B 3/67326; Y02B 80/24; Y10T 428/24182
USPC ............. 52/204.593, 204.595, 789.13, 171.3, 52/786.1; 428/34, 120; 156/109
See application file for complete search history.

(56) References Cited

U.S. PATENT DOCUMENTS

| | | | | |
|---|---|---|---|---|
| 1,370,974 A | * | 3/1921 | Kirlin | 428/34 |
| 1,770,200 A | * | 7/1930 | Comstock | 52/576 |
| 1,774,860 A | * | 9/1930 | Wendler et al. | 165/170 |
| 3,990,201 A | * | 11/1976 | Falbel | 52/171.3 |
| 4,064,300 A | * | 12/1977 | Bhangu | 428/120 |
| 4,394,201 A | * | 7/1983 | Haeussler | 156/73.6 |
| 4,429,509 A | * | 2/1984 | Vachet et al. | 52/786.1 |
| 4,683,154 A | * | 7/1987 | Benson et al. | 428/34 |
| 4,786,344 A | * | 11/1988 | Beuther | 156/109 |
| 4,944,125 A | * | 7/1990 | Ito | 52/171.3 |
| 5,107,649 A | | 4/1992 | Benson et al. | |
| 5,157,893 A | | 10/1992 | Benson et al. | |
| 5,175,975 A | * | 1/1993 | Benson et al. | 52/788.1 |
| 5,310,593 A | * | 5/1994 | Tsujimoto et al. | 428/166 |
| 5,433,056 A | | 7/1995 | Benson et al. | |
| 5,489,321 A | | 2/1996 | Tracy et al. | |
| 5,643,644 A | * | 7/1997 | Demars | 428/34 |
| 5,657,607 A | * | 8/1997 | Collins et al. | 52/786.13 |
| 5,739,882 A | * | 4/1998 | Shimizu et al. | 349/123 |
| 5,891,536 A | * | 4/1999 | Collins et al. | 428/34 |
| 5,989,659 A | * | 11/1999 | Kato et al. | 428/34 |
| 6,210,763 B1 | * | 4/2001 | Katoh et al. | 428/34 |
| 6,261,652 B1 | * | 7/2001 | Poix et al. | 428/34 |
| 6,387,460 B1 | * | 5/2002 | Shukuri et al. | 428/34 |

(Continued)

OTHER PUBLICATIONS

PCT/US2015/063372 International Search Report and Written Opinion dated Mar. 16, 2016 (15 pages).

*Primary Examiner* — Joshua J Michener
*Assistant Examiner* — Kyle Walraed-Sullivan
(74) *Attorney, Agent, or Firm* — Michael Best & Friedrich LLP

(57) ABSTRACT

An insulated glazing unit including a first glass element and a second glass element having congruent shapes. The insulated glazing unit also includes a plurality of elongated spacers disposed between the first glass element and the second glass element to space the first glass element from the second glass element. The spacers are in rolling, line contact with a surface of one or both of the first glass element and the second glass element, and each spacer is elongated along an axis. The spacers are oriented on the surface such that the axis of each of the spacers is tangent to one or more imaginary circular lines superimposed on the surface and having a common center.

20 Claims, 10 Drawing Sheets

(56) References Cited

U.S. PATENT DOCUMENTS

| | | | |
|---|---|---|---|
| 6,420,002 B1 | 7/2002 | Aggas et al. | |
| 6,436,492 B1 * | 8/2002 | Landa et al. | 428/34 |
| 6,472,032 B1 * | 10/2002 | Asano | 428/34 |
| 6,479,112 B1 * | 11/2002 | Shukuri et al. | 428/34 |
| 6,506,272 B1 * | 1/2003 | Aggas | 156/109 |
| 8,821,999 B2 * | 9/2014 | Grzybowski et al. | 428/34 |
| 2001/0012545 A1 * | 8/2001 | Nalepka et al. | 428/34 |
| 2002/0064610 A1 * | 5/2002 | Misonou | 428/34 |
| 2002/0078711 A1 * | 6/2002 | Domi et al. | 65/58 |
| 2004/0265518 A1 * | 12/2004 | Yoshizawa et al. | 428/34 |
| 2005/0103052 A1 * | 5/2005 | Minaai | 65/43 |
| 2006/0013979 A1 * | 1/2006 | Ensinger | 428/36.9 |
| 2007/0245686 A1 | 10/2007 | Samuels | |
| 2007/0251164 A1 * | 11/2007 | Egeresi | 52/171.3 |
| 2008/0307793 A1 * | 12/2008 | Benoit et al. | 60/752 |
| 2009/0074997 A1 * | 3/2009 | Stark | 428/34 |
| 2009/0151853 A1 * | 6/2009 | Cooper | 156/104 |
| 2010/0175347 A1 * | 7/2010 | Bettger et al. | 52/788.1 |
| 2010/0279037 A1 * | 11/2010 | Huang et al. | 428/34 |
| 2010/0279038 A1 * | 11/2010 | Wang | 428/34 |
| 2012/0202049 A1 * | 8/2012 | Valladeau | C03C 3/091 428/325 |
| 2012/0202075 A1 * | 8/2012 | Jones | 428/441 |
| 2012/0247063 A1 * | 10/2012 | Grzybowski et al. | 52/786.13 |
| 2012/0315409 A1 * | 12/2012 | Jones | 428/34 |
| 2013/0142972 A1 | 6/2013 | Raggio | |
| 2013/0202821 A1 * | 8/2013 | Son et al. | 428/34 |
| 2013/0273296 A1 * | 10/2013 | Jeon et al. | 428/69 |
| 2013/0306222 A1 * | 11/2013 | Dennis et al. | 156/109 |
| 2013/0319598 A1 | 12/2013 | Grommesh et al. | |
| 2014/0322461 A1 | 10/2014 | Friedl et al. | |
| 2014/0335291 A1 * | 11/2014 | Hasegawa et al. | 428/34 |
| 2015/0068666 A1 * | 3/2015 | Abe et al. | 156/109 |

* cited by examiner

LOW-FRICTION SPACER SYSTEM FOR VACUUM INSULATED GLASS

BACKGROUND

The invention relates to a method and apparatus for an evacuated glazing element and, more specifically, to an evacuated glazing element including a spacer disposed between adjacent glass panes.

Many existing insulated glazing elements (e.g., vacuum-insulated glass units or assemblies) include two or more glass panes that are separated from each other by a space. Some existing glass panel assemblies incorporate small spacers that are positioned between the glass panes by small spacers, and the space is sealed along the perimeter edge with a strip that is bonded to the outermost glass panes to form a transparent envelope that encloses an evacuated space.

A temperature differential across the glass panel assembly can significantly impact the structure of the assembly and, in some cases, cause the assembly to fail. More specifically, the temperature of the exterior pane typically approaches the outside air temperature (contracting when exposed to cold, expanding when exposed to heat). The interior pane typically remains at a relatively constant temperature that is consistent with the inside air temperature (e.g., in a building). Movement of the exterior pane (i.e. contraction or expansion) relative to the interior pane is known as "differential pane movement."

Spacers are used to maintain spacing between glass panes while minimizing heat transfer across the space between panes. Some conventional spacers take the form of cylindrical metal pillars that are typically located in a square array, with the circular faces of each pillar in opposite contact with the respective glass panes (i.e. the spacers act as support columns). The spacers often are shaped with a diameter that is larger than the height to avoid overturning in response to a friction force. With these spacers, evacuation of the glass pane envelope (i.e. the space between the panes) induces a significant force (e.g., 2000 pounds) on each square foot of the glass panes. This translates to approximately a 50,000 psi contact stress on each pillar face, which creates a large static friction force between the pillar and the pane. The pressure also results in bending, or "doming," of the glass pane over each pillar, forming a pattern suggestive of quilted fabric.

During differential pane movement caused by changes in outside air temperature, the high static friction force, exacerbated by the doming of the glass over each pillar, resists slippage so much that the glazing unit can undesirably bow into (or out of) the building. Slippage of the panes over the flat faces of the pillars (when the static friction resistance to movement is overcome) can also cause significant noise and undesirable scratches.

Other spacers have a spherical shape to provide rolling contact between the glass panes and the spacers. However, these spherical spacers have a very small point loading due to their shape and the tangential contact with the panes. This small point loading typically causes damage to the glass due to indentations in the glass surface that is analogous to a broken ice pattern caused by dropping a bowling ball onto the surface of a frozen pool of water. Although the number of spherical spacers can be increased to lower the contact stresses below the threshold for indentation, the large quantity can become visible and the inherent point contact between a sphere and a plane defined by the surface of the glass still typically damages the glass.

SUMMARY

Therefore, there has developed a need for a spacer design that combines low-friction rolling contact with sufficient contact area to reduce the risk of indentation in the glass. A first aspect of the present invention is an evacuated insulated glass unit that can be used to form low heat loss windows. A second aspect of the present invention is a method for fabricating an evacuated insulated glass unit for low heat loss windows.

For manufacturing a pattern of spacers capable of providing nearly-friction-free accommodation of differential pane movement in vacuum glazing, regardless of pane size, it is desirable to fabricate spacers which are capable of rolling contact with the adjacent glass panes, functioning in an analogous manner as needle bearings. Though optional, it is desirable that such rolling contact spacers be adhered to at least one pane with sufficient adhesion to tolerate subsequent handling and manufacturing operations, and yet allowing the roller spacers to break away cleanly, and without leaving abrasive debris, during differential pane movement under normal use, so as not to interfere with the bearing action. It is desirable, for cost considerations, that a multiplicity of roller spacers be applied and bonded at the same time over at least a portion of a glass pane, if not the entire pane. Furthermore, it is desirable that the roller spacers be oriented during application such that the spacers are tangent to concentric circles, so that differential pane movement can occur uniformly about the common center of the imaginary circles.

The invention is described in detail as a spacer arrangement in which a single spacer is disposed in the glazing unit in a regular pattern. However, it can readily be seen that other patterns, regular or not, can be used, and multiple spacers can be used at a single location to decrease the local contact stresses, without compromising the desired functionality. It can also be readily seen that function will not be substantially impaired if spacer orientation is not perfectly tangent, and if the circles of tangency are not perfectly concentric.

It is therefore the object of the present invention to provide a rolling spacer design which will not only eliminate warranty costs due to pillar-caused scratching damage to coatings or glass, eliminate stick-slip noise of non-rolling pillars against glazing, and will also work in a complementary manner with a compliant edge seal to eliminate bowing of evacuated glazing units during outside air temperature swings, and moreover that the function of maintaining relative pane location is not borne solely by the perimeter seal.

In one aspect, the disclosure relates to a method for fabricating an insulated glazing assembly. The method generally includes providing at least two glass elements of substantially congruent shapes. Each glass element defines two substantially planar faces. A pattern of rolling cylindrical spacers, each oriented to be tangent, or nearly so, to one of a number of concentric circles. The glass elements are positioned substantially parallel to and spaced apart from each other by the rolling spacers, thereby defining an interior space. A flexible seal strip, with each edge bonded to the adjacent glass element, thereby forms an enclosed and evacuable interior space.

In another aspect, the disclosure relates to a method for creating spacers having roller bearing functionality to prevent direct contact between the glass panes of vacuum insulating glass. The method generally includes a method of forming the roller spacers, a method of arranging roller spacers to at least one glass pane in a desirable predefined pattern, and optionally a method of adhering said roller spacers to at least one pane. A method of applying a multitude of wire spacers at once, with substantial cost reduction benefit, is described.

In another aspect, the disclosure relates to an article of evacuated insulated glazing. The article generally includes at least two glass elements of substantially congruent shapes. Each glass element defines two substantially planar faces.

The elements are spaced apart by a pattern of roller spacers to accommodate differential pane movement without significant bowing. The glass elements are positioned substantially parallel to and spaced apart from each other by the roller spacers, defining an interior space extending therebetween. A seal strip is bonded on the glass elements. The seal strip seals the interior space.

In one embodiment, the invention is directed to an insulated glazing unit including a first glass element and a second glass element having congruent shapes. The insulated glazing unit also includes a plurality of elongated spacers disposed between the first glass element and the second glass element to space the first glass element from the second glass element. The spacers are in rolling, line contact with a surface of one or both of the first glass element and the second glass element, and each spacer is elongated along a first axis. The spacers are oriented on the surface such that the first axis of each of the spacers is tangent to one or more imaginary circular lines superimposed on the surface and having a common center.

In another embodiment, the invention provides a method of manufacturing an insulated glazing assembly having a first glass element and a second glass element. The method includes spacing the first and second glass elements from each other with spacers that have rolling, line contact with a surface of one or both of the first glass element and the second glass element. Each spacer is elongated along a first axis. The method further includes orienting the spacers on the surface such that the first axis of each of the spacers is tangent to one or more imaginary circular lines superimposed on the surface and having a common center.

In another embodiment, the invention provides an insulated glazing unit including a first glass element and a second glass element having congruent shapes. The insulated glazing unit also includes a plurality of elongated spacers that are disposed between the first glass element and the second glass element to space the first glass element from the second glass element. Each of the spacers is elongated along a first axis and has a second axis that is perpendicular to the first axis. The second axis of each of the spacers defines a rolling direction of the corresponding spacer. The spacers are in rolling, line contact with a surface of one or both of the first glass element and the second glass element, and the spacers are oriented on the surface such that the rolling direction of at least one of the spacers differs from the rolling direction of at least another of the spacers.

Other aspects of the invention will become apparent by consideration of the detailed description and accompanying drawings.

It should be understood that the invention is not limited in its application to the details of construction and the arrangements of the components set forth in the following description or illustrated in the above-described drawings. Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

As used herein, the terms "insulated glazing unit" and "glass panel assembly" are synonymous and denote a window glazing assembly formed from at least two glass members or glass elements (referred to as glass panes for purposes of description) that are at least partially transparent to electromagnetic radiation, that are substantially parallel along their planar faces, and that are substantially congruent shapes with surrounding edges sealed to form an interior space between the glass panes. The interior space can be at least partially filled with a gas that is less conductive and, in some constructions, more viscous than air, or evacuated (e.g., by drawing a vacuum).

"Differential pane movement" refers to the relative pane movement between two adjacent glass panes that occurs when the temperature of one pane changes relative to the temperature of the other pane. It may also refer to the relative pane movement that occurs under mechanical influence or other influence (e.g., impact during handling or use).

"Hermetic" refers to a seal that allows helium leakage rates of no more than about $10^{-8}$ to $10^{-9}$ standard cubic centimeters/second ("scc/sec") per foot of seal length.

"Highly-hermetic" refers to a seal that allows helium leakage rates of no more than about $10^{-9}$ scc/sec, and preferably no more than about $10^{-11}$ scc/sec, and most preferably no more than about $10^{-12}$ scc/sec per foot of seal length.

The terms "flexible" and "compliant" refer to a structure having a resilient nature, and the ability to accommodate movement.

The term "non-compliant" refers to a structure having a rigid or brittle nature, in contrast with "flexible" or "compliant."

The term "static", when referring to friction or contact, means that the two surfaces in contact do not experience relative motion.

The term "dynamic", when referring to friction or contact, means that the two surfaces in contact experience relative motion.

Figure 1A:
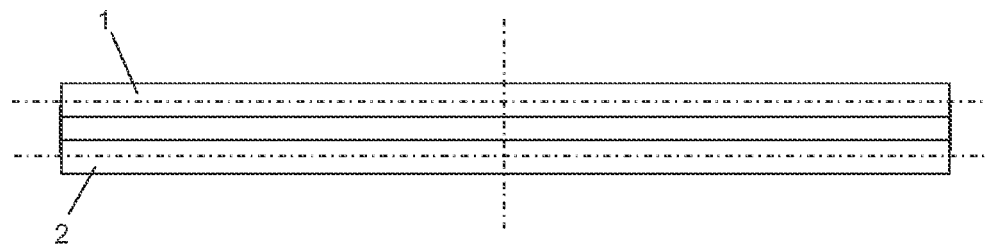
FIG. 1a is an edge view of an evacuated glass unit embodying the present invention and including glass panes that are spaced apart from each other by a gap that is sealed along the periphery of the glass panes.
Figure 1B:
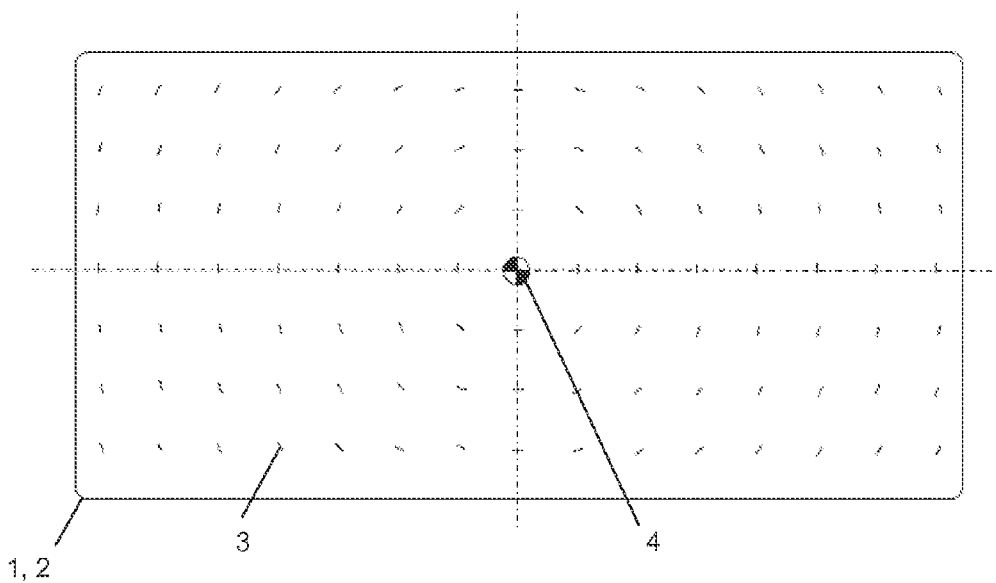
FIG. 1b is a plan view of the evacuated glass unit of FIG. 1 illustrating the glass panes and rolling contact spacers coupled to the glass panes and arranged in a grid pattern that is centered on a centroid of at least one of the glass panes.

FIGS. 1a and 1b illustrate an exemplary evacuated insulated glazing unit including two glass elements 1, 2 that are spaced apart by rolling contact spacers 3 (FIG. 1b) made of an incompressible or substantially incompressible material (e.g., composite, plastic, glass, metal, etc.). Each spacer 3 is relatively small in size (e.g., approximately 100 microns in diameter by 1000 microns long). When the glazing unit is viewed from a distance, the small size of the spacers 3 makes the spacers 3 visually unobtrusive (i.e. substantially invisible under most lighting and background conditions). Optionally, the spacers 3 can be temporarily adhered to at least one of the glass elements 1 and 2. In the embodiment of FIG. 1b, each spacer 3 is placed equidistant from adjacent spacers 3 such that the spacers are oriented in an array with a square or rectangular grid pattern. The orientation of each elongated spacer is not random, but is orthogonal to a common center 4 (illustrated in FIG. 2 as coinciding with a centroid of the glass elements 1, 2).

Figure 2:
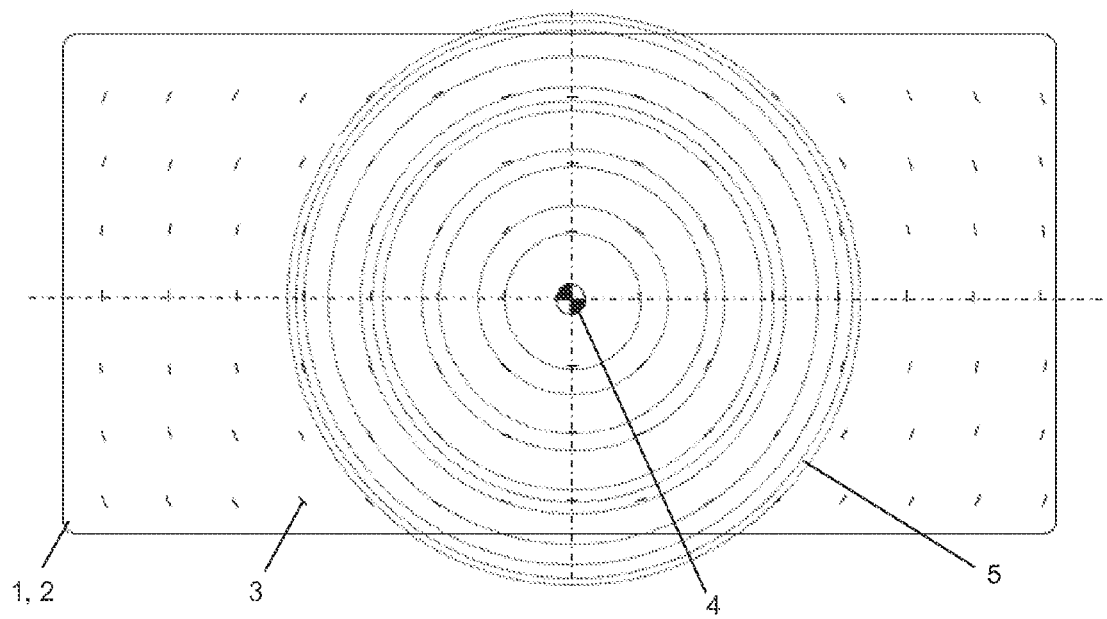
FIG. 2 is another plan view of the evacuated glass unit including the spacers and illustrating imaginary concentric circles to which the spacers are oriented tangent or substantially tangent.

FIG. 2 illustrates a series of imaginary concentric circles 5 (having the common center 4) superimposed onto the glazing unit and showing that the rolling contact spacers are tangent to these circles. As will be appreciated, positioning the spacers 3 on the surface may not be exact such that one or more of the spacers 3 can be oriented on the surfaces of the glass elements 1, 2 in a nearly tangent arrangement (e.g., offset from tangent by a 1-5 degrees, intersecting the circles, etc.) to one or more imaginary circular lines (e.g., partial or whole circles) that share a common center 4. The term 'tangent' as used in the description and the claims should be interpreted to encompass spacers 3 that are at least nearly or approximately tangent to imaginary circular lines that share a common center 4. Also, at least some of the circles may be superimposed on the surface such that they are not quite concentric with each other (i.e. the circles would be nearly concentric). For example, the center points of two or more of the circles may be separated by a short distance (e.g., 1-10 inches) without deviating from the invention. The term 'common center,' as used in the description and the claims, should be interpreted to encompass circular lines that are concentric with each other or nearly concentric. That is, the term 'common center' can refer to the region encompassed by both centers of nearly concentric circular lines (e.g., the common center for two imaginary circles with centers that are spaced apart by 5 inches would encompass the region between and proximate to the two centers, and including the two centers).

By arranging the spacers 3 along one or more imaginary curved lines, the spacers 3 have different rolling directions to accommodate differential pane movement without lubrication of the elements 1, 2. That is, each spacer 3 has a longitudinal or first axis extending along the elongated spacer 3, and a second axis that is oriented perpendicular to (e.g. crosses over) the first axis. For purposes of this application, the first axis is determined by a straight line passing through the center of ends of the spacer 3 and defines the axis about which the spacer 3 can roll. As will be appreciated, the first axis can extend through the opposite ends of the spacer 3 with or without extending through a center portion of the spacer body. The second axis defines a rolling direction for the spacer 3, and the spacers 3 are oriented on the surface such that the rolling direction of at least one of the spacers 3 differs from a rolling direction of at least another of the spacers 3.

In addition, the spacers 3 are elongated with the axis of each spacer 3 oriented substantially parallel to the glass elements 1, 2 to uniformly support the glass elements 1, 2 in spaced relation while minimizing or eliminating bowing when a vacuum is drawn. Stated another way, the spacers 3 make line contact with the surface, which reduces the contact stress applied to the glass element 1, 2 and reduces heat transfer through the unit. The rolling contact of the spacers 3 also reduces, and possibly can eliminate, scratching of the glass or any coating (e.g., low-emissivity coating) on the glass. The spacers 3 can be formed or fabricated from wire, fiber, or other filaments that have accurate and uniform diameters. Also, the length of the spacers 3 can vary depending on the support desired.

Figure 3:
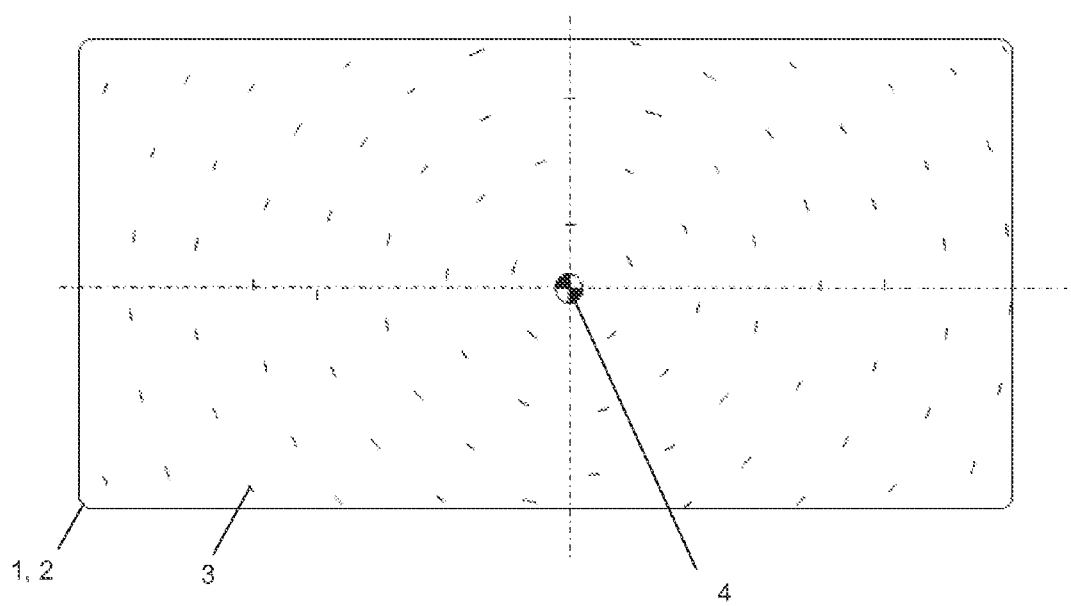
FIG. 3 is a plan view of another exemplary evacuated glass unit including rolling contact spacers arranged in equal radial and annular increments.
Figure 4:
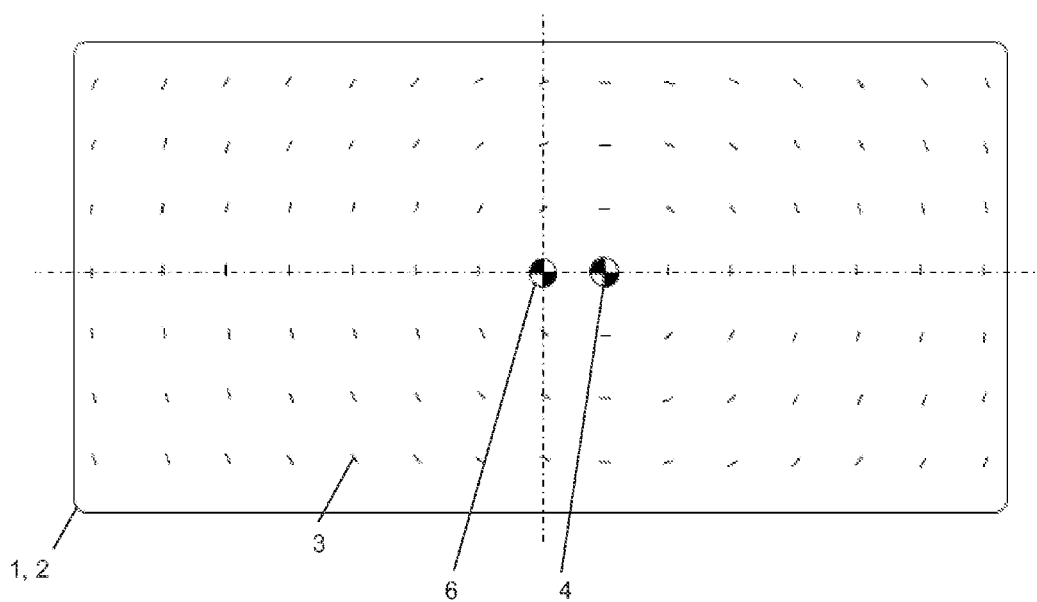
FIG. 4 is a plan view of another exemplary evacuated glass unit including glass panes and rolling contact spacers arranged in a pattern that is offset from a centroid at least one of the glass panes.
Figure 5:
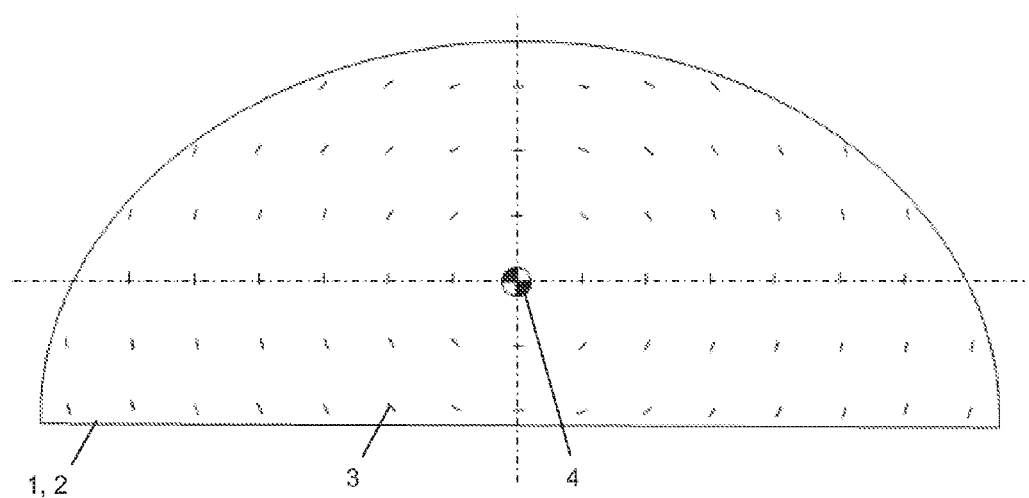
FIG. 5 is a plan view of another exemplary evacuated glass unit including arcuate-shaped glass panes and rolling contact spacers arranged in a pattern that is centered on a centroid of at least one of the glass panes.
Figure 6:
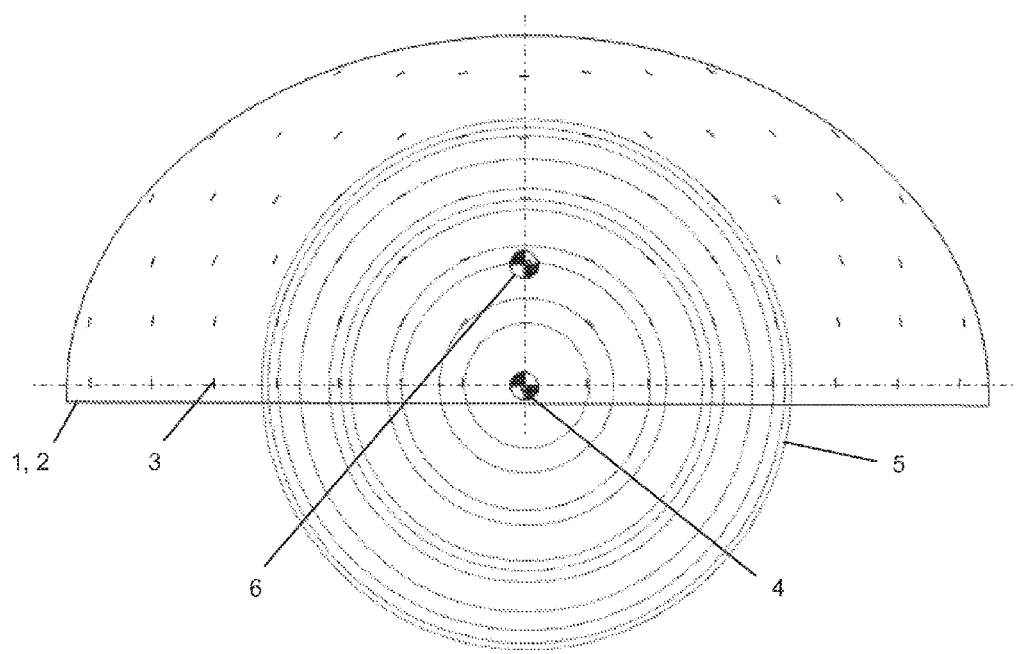
FIG. 6 is a plan view of another exemplary evacuated glass unit including arcuate-shaped glass panes and rolling contact spacers arranged in a pattern that is offset from a centroid of at least one of the glass panes.

As will be appreciated, the spacers 3 and the different arrangements of spacers 3 described in detail below permit differential pane movement (expansion and contraction) relative to the common center of the spacer arrangement. That is, the common point 4 is a "virtual pin" at the common center of the imaginary circles (or other curved lines) (i.e. as if the two elements 1, 2 are pinned at this location). The insulated glazing unit can be designed so that expansion or contraction can be controlled relative to the location of the common point 4 (i.e. the expansion or contraction occurs about the common point 4) to provide the least resistance to differential pane movement. This orientation of the spacers 3 also limits the load and stresses in the edge seal caused by differential pane movement. With reference to FIGS. 4 and 6, the common point 4 can be located anywhere—either aligned with a center (centroid) of the glass element(s) 1, 2, or offset from the center (on the surface of the elements 1, 2, or off the surface). Also, the spacers 3 can be used to separate glass elements 1, 2 that have any shape (e.g., rectangular as shown in FIGS. 1b, 2-4, or non-rectangular shapes such as a hemi-circular shape (see FIG. 5) or other polygonal or curved shapes).

In general, the spacers 3 are arranged in a uniform pattern such that the load on each spacer is nearly identical from one spacer to the next. As shown in FIGS. 1-9b, the spacers 3 are defined by rolling rods that are oriented tangent to the imaginary concentric circles.

FIGS. 1b and 2 illustrate an arrangement of the spacers 3 that has a rectangular (e.g., square) array or grid pattern. FIG.

3 illustrates an arrangement of the spacers 3 that has a circular or curved array or grid pattern. With reference to FIGS. 2 and 3, the spacers 3 are oriented tangent or substantially tangent to imaginary circles. The main difference between the arrangement of FIG. 3 relative to the arrangement of FIG. 2 is that the spacers 3 in FIG. 3 have uniform radial spacing, and the spacers 3 are tangent to a given imaginary circle and are separated by arcs of substantially equal length. This pattern results in a pseudo-random pattern that makes the spacers more difficult for the pattern-seeking human eye to discern. The radial nature of this pattern lends itself to an automated robot which is designed with a radial arm movement, rather than an X-Y table.

Figure 7A:
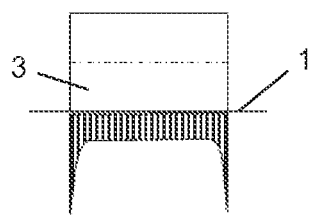
FIG. 7a is a schematic view illustrating the stress pattern produced by an exemplary spacer having a cylindrical shape with the side of the column in contact with one of the glass panes.
Figure 7B:
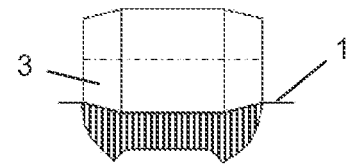
FIG. 7b is a schematic view illustrating the stress pattern produced by an exemplary spacer having a cylindrical shape with blended edges and with the side of the column in contact with one of the glass panes.
Figure 7C:
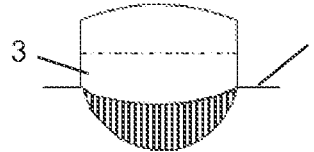
FIG. 7c is a schematic view illustrating the stress pattern produced by an exemplary spacer having a curved-cylindrical shape with the curved side of the column in contact with one of the glass panes.
Figure 7D:
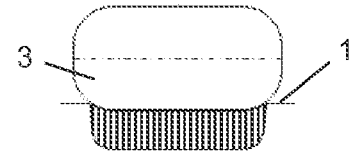
FIG. 7d is a schematic view illustrating the stress pattern produced by an exemplary spacer having a logarithmic-cylindrical shape with the side of the column in contact with one of the glass panes.

FIGS. 7a-7d show different exemplary spacers 3 that can be used in an insulated glazing unit, and how the pillar- or column-shaped spacers 3 (i.e. different shapes of revolution about a single axis) impact the contact stress distribution profile at the spacer-pane interface. FIG. 7a illustrates a cylindrical spacer 3 for which the contact stress spikes at each end of the spacer 3 (e.g., similar to a cylindrical needle bearing). FIG. 7b illustrates a cylindrical spacer that has beveled or chamfered ends blended smoothly with the cylindrical portion; for this shape, the sharp spikes of the purely cylindrical spacer are substantially muted. FIG. 7c illustrates a barrel-shaped spacer 3 having a curved wall. This shape reduces (and can eliminate) sharp spikes at each end and the peak stress is located at the center. FIG. 7d illustrates a substantially cylindrical spacer 3 having ends of logarithmic or a nearly-radiused profile. This shape distributes the stress substantially uniformly over most of the spacer length, dropping off smoothly to zero at each end. The shape illustrated in FIG. 7d would be considered to have the least risk of indenting the surface of the glass element 1, 2 than the other illustrated shapes.

Figure 8A:
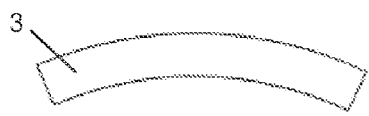
FIG. 8a is a plan view of another exemplary spacer defined by a continuously curved body.
Figure 8B:
FIG. 8b is a plan view of another exemplary spacer defined by a partially curved body.

FIGS. 8a and 8b show two non-straight spacers 3. FIG. 8a illustrates a rolling contact spacer 3 that takes the form of an arc. FIG. 8b illustrates a spacer 3 that is bent (i.e. the spacer 3 has curved and straight portions. The spacers 3 can have an arcuate or bent shape when initially coupled to the glass elements 1, 2 to limit spacer movement (rolling) along the surface during assembly. Under bearing pressure (e.g., when the glass elements 1, 2 are coupled together), and combined with differential pane movement, the non-straight spacers 3 can straighten to facilitate rollability of the spacers 3 and minimize resistance to differential pane movement.

Figure 9A:
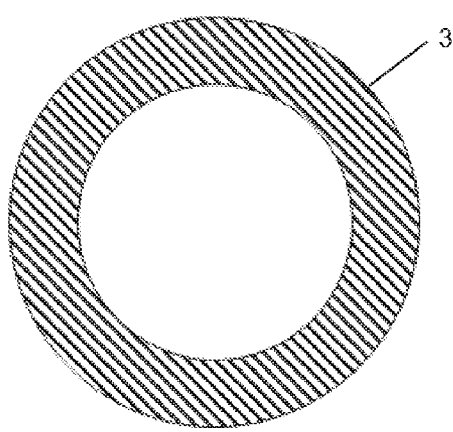
FIG. 9a is a section view of an exemplary spacer including a hollow interior.
Figure 9B:
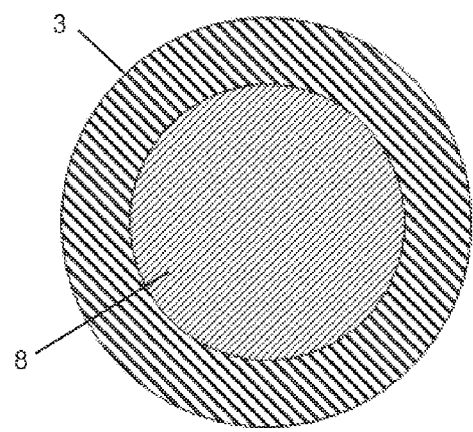
FIG. 9b is a section view of an exemplary spacer including a hollow interior having fill material.

FIGS. 9a and 9b show that the spacers 3 can be hollow. FIG. 9a illustrates an unfilled, hollow spacer 3. FIG. 9b illustrates a hollow spacer 3 that is filled with a material (e.g., metal, glass, plastic, composite, etc.). In general, a hollow spacer 3 can reduce thermal conductivity through the spacer 3.

Figure 10A:
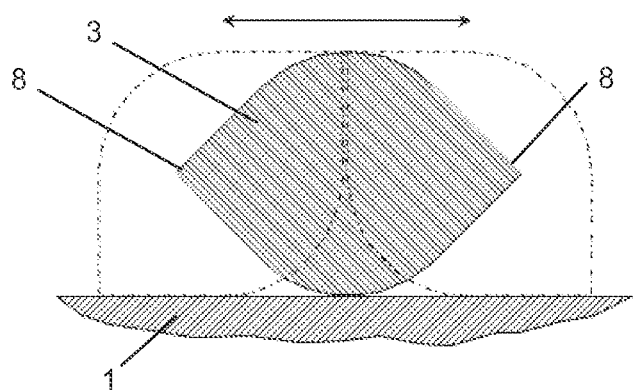
FIG. 10a is a partial section view of one glass pane and an exemplary spacer including opposite surfaces of revolution separated by stops to limit rolling of the spacer on the glass pane.
Figure 10B:
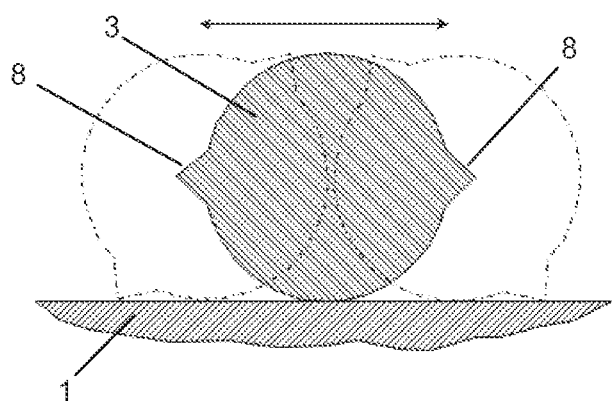
FIG. 10b is a partial section view of one glass pane and another exemplary spacer including opposite surfaces of revolution separated by stops to limit rolling of the spacer on the glass pane.

FIGS. 10a and 10b show that the spacers 3 can be shaped to have opposite surfaces of revolution that are separated from each other by stops or projections 8. The spacers 3 in FIGS. 10a and 10b allow partial rolling of the spacer 3 (i.e. until the stop 8 contacts one of the surfaces of the glass elements 1, 2). This can be useful to limit substantial movement of the spacers 3 during manufacturing, or when the glazing unit experiences differential pane movement.

Figure 11:
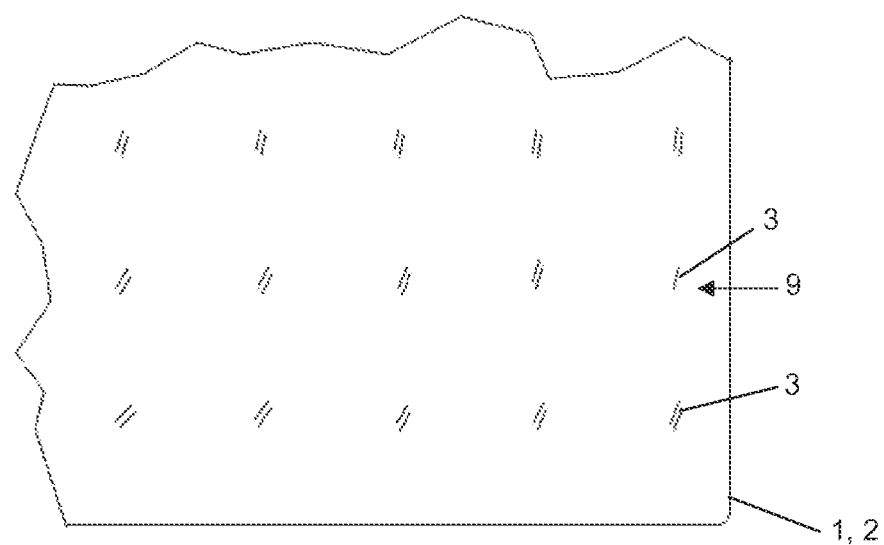
FIG. 11 is a plan view of a portion of another exemplary evacuated glass unit including pairs of spacers disposed on the glass unit.

FIG. 11 illustrates a portion of an evacuated insulated glazing unit including first and second glass elements 1, 2 that are spaced apart by rolling contact spacers 3 made of a substantially incompressible material. Two spacers 3 are placed side by side at each designated location for bearing pane load. In the event that one or more locations (e.g., the location designated by reference numeral 9) on the unit has only one spacer 3, the glass elements 1, 2 are still adequately supported by the remaining spacers 3.

Illustrative examples of the present invention are described in greater detail below.

EXAMPLE 1

Fabrication of a Rectangular Vacuum Glass Unit

With an automated wire cutter, rolling contact spacers are cut to 1 mm lengths from Hastelloy® wire of 0.15 mm diameter, and are positioned by automated computer numerical control machine to fall onto a 24 inch×48 inch×⅛ inch thick rectangular glass pane to form a 16 mm by 16 mm grid pattern. After each spacer is placed, a pair of rotating fingers orients the spacer without changing its position relative to the pane edges so that its axis of symmetry is tangent (or nearly so) to one of the imaginary circles having a common center which is coincident with the pane centroid. A second glass pane, having the same dimensions as the first, is placed on top of the first glass pane in exactly the same orientation such that the edges of both panes are adjacent around the entire perimeter, and is allowed to rest on, and is spaced apart from the first pane by, the array of said spacers. The gap between the edges of the two panes is hermetically sealed along each edge of the respective glass panes. The resulting envelope is evacuated through a glass ferrule to $5 \times 10^{-4}$ Torr and simultaneously heated for 30 minutes to 250° C. to drive out internal moisture. The glass ferrule is then melted closed to maintain the vacuum over the life of the evacuated vacuum glass unit.

EXAMPLE 2

Vacuum Glass Unit having Shaped Spacers

With an automated roll-forming machine (analogous to a screw production machine) having a rolling blade in the form of a carbide disc with shaped and sharpened edge, Nitinol wire 0.15 mm in diameter is swaged and severed to form rolling contact spacers 1.5 mm in length and having logarithmic-shaped ends as shown in FIG. 14d, which fall into a bin. These spacers are retrieved from the bin by pick-and-place robot, with suitable end effector and robotic vision. The robot brings one end of each spacer into contact with a surface held at 80° C. and controllably coated with a melted vacuum-refined wax (e.g., Apiezon W) such that wax is a small amount of wax is transferred to the spacer end contacted. The robot then places each spacer onto a 18 inch×36 inch×⅛ inch thick rectangular glass pane to form a 18 mm by 18 mm grid pattern. Before releasing each spacer, the robot orients it to be nearly tangent to one of the imaginary circles having a common center which is coincident with the pane centroid. A hot wire coil, mounted on the robot end effector, transfers radiant energy to the spacer, assures that the wax-coating on its end is liquefied and forms an adhesive meniscus between the spacer and the pane. When the hot coil is removed, the spacer heat flows quickly into the cold glass, freezing the wax and securing the spacer temporarily into position. A second glass pane, having dimensions of 17.5 inch×35.5 inch×⅛ inch thick, is placed on top of the first glass pane in exactly the same orientation with centroids aligned such that the edges of both panes are adjacent around the entire perimeter. The second pane, having a low emissivity coating on its underside, is allowed to rest by gravity on top of, and is spaced apart from the first pane by, the array of said spacers. The assembly is then appropriately fixtured to maintain glass and spacer positions during subsequent manufacturing operations. The gap between the edges of the two panes is then hermetically sealed with a compliant sealing system consisting of a flexible, ribbed metal foil ribbon is bonded along each edge to its respective glass pane using a near-room-temperature bonding process, such as ultrasonic bonding. The wax prevents spacer movement under the influence of ultrasonic vibration and handling. The resulting envelope is evacuated through a glass ferrule to $5 \times 10^{-4}$ Torr and simultaneously heated for 30 minutes to 250° C. to drive out internal moisture. Although the wax melts, each spacer is trapped in place as they resist the external pressure acting on the two glass panes. The glass ferrule is then melted closed to maintain the vacuum over the life of the evacuated vacuum glass unit. Soon after installation of the unit, differential pane movement under high external force will induce the rolling contact spacers to break away cleanly, and without leaving abrasive debris, so as not to interfere with the bearing action. In fact, the wax serves as a lubricant for the areas in rolling contact, further protecting against damage to the glass surface and scratching of the low-emissivity coating.

It is understood that the invention may embody other specific forms, or incorporate combinations of the embodiments described herein, without departing from the spirit or characteristics the invention. While specific embodiments have been illustrated and described, other modifications may be made without significantly departing from the spirit of the invention.

Various features of the invention are set forth in the following claims.

The invention claimed is:

1. An insulated glazing unit comprising:
a first glass element;
a second glass element, the first and second glass elements having congruent shapes; and
a plurality of spacers disposed between the first glass element and the second glass element to space the first glass element from the second glass element, each of the spacers elongated along an axis,
wherein the spacers are in rolling, line contact with a surface of one or both of the first glass element and the second glass element such that the spacers are configured to roll about their axis in line contact with the surface, and
wherein the spacers are oriented on the surface such that the axis of at least one of the spacers is tangent to an imaginary circular line superimposed on the surface, and at least another of the spacers is tangent to the same imaginary circular line or a different imaginary circular line having a common center with the first imaginary circular line.

2. The insulated glazing unit of claim 1, wherein the spacers are arranged along a plurality of imaginary circles superimposed on the surface, and wherein the circles are concentric with each other.

3. The insulated glazing unit of claim 2, wherein the imaginary circles have uniform radial spacing from the common center.

4. The insulated glazing unit of claim 3, wherein the spacers arranged along each of the imaginary circles are separated by arcs of substantially equal length.

5. The insulated glazing unit of claim 2, wherein the center of the circles is aligned with a centroid of the first glass element.

6. The insulated glazing unit of claim 2, wherein the center of the circles is offset from a centroid of the first glass element.

7. The insulated glazing unit of claim 1, wherein a space is defined between the first glass element and the second glass element, the insulated glazing unit further comprising a seal coupled to the outer peripheries of the first glass element and the second glass element to seal the space, and wherein the space between the first and second glass elements is evacuated.

8. The insulated glazing unit of claim 1, wherein at least some of the spacers are temporarily affixed to at least one of the first and second glass elements.

9. The insulated glazing unit of claim 1, wherein at least one of the spacers is defined by a column-shape that is curved or chamfered.

10. The insulated glazing unit of claim 1, wherein at least one of the spacers is a non-cylindrical surface of revolution.

11. The insulated glazing unit of claim 1, wherein the spacers have a surface of revolution and at least one of the spacers has a stop interrupting the surface of revolution to limit rolling motion of the spacer on the surface.

12. The insulated glazing unit of claim 1, wherein an interior of each of the spacers is hollow.

13. The insulated glazing of claim 1, wherein at least one of the spacers is elongated and the at least one spacer is curved in the elongated direction.

14. A method of manufacturing an insulated glazing assembly having a first glass element and a second glass element, the method comprising:
spacing the first and second glass elements from each other with spacers, the spacers having rolling, line contact with a surface of one or both of the first glass element and the second glass element, each of the spacers elongated along an axis such that the spacers are configured to roll about their axis in line contact with the surface; and
orienting the spacers on the surface such that the axis of at least one of the spacers is tangent to an imaginary circular line superimposed on the surface, and at least another of the spacers is tangent to the same imaginary circular line or a different imaginary circular line having a common center with the first imaginary circular line.

15. The method of claim 14, further comprising aligning the spacers along a plurality of imaginary circles superimposed on the surface, and wherein the circles are concentric with each other.

16. The method of claim 15, further comprising arranging the spacers so that the imaginary circles have uniform radial spacing from the common center.

17. The method of claim 14, further comprising
sealing the first and second glass elements in spaced relation; and
evacuating the space between the first and second glass elements.

18. The method of claim 14, further comprising temporarily affixing at least some of the spacers to the surface.

19. An insulated glazing unit comprising:
a first glass element;
a second glass element, the first and second glass elements having congruent shapes; and
a plurality of elongated spacers disposed between the first glass element and the second glass element to space the first glass element from the second glass element, each of the spacers elongated along a first axis and having a second axis perpendicular to the first axis, the second axis of each of the spacers defining a rolling direction of the corresponding spacer such that the spacers are configured to roll about their first axis in the rolling direction while maintaining line contact with the surface, wherein the spacers are in rolling, line contact with a surface of one or both of the first glass element and the second glass element, and wherein the spacers are oriented on the surface such that the rolling direction of at least one of the spacers differs from the rolling direction of at least another of the spacers.

20. The insulated glazing unit of claim 19, wherein the second axes of the spacers are oriented toward a common point.

* * * * *